United States Patent
Chao et al.

(10) Patent No.: US 9,179,201 B2
(45) Date of Patent: Nov. 3, 2015

(54) SYSTEMS AND METHODS OF DETECTING SIGNIFICANT FACES IN VIDEO STREAMS

(75) Inventors: Chen-Yu Chao, Shulin (TW); Shih-Hsien Yeh, Shinjuang (TW)

(73) Assignee: CYBERLINK CORP., Taipei (TW)

( * ) Notice: Subject to any disclaimer, the term of this patent is extended or adjusted under 35 U.S.C. 154(b) by 892 days.

(21) Appl. No.: 13/218,508

(22) Filed: Aug. 26, 2011

(65) Prior Publication Data

US 2013/0051756 A1 Feb. 28, 2013

(51) Int. Cl.
| | | |
|---|---|---|
| H04N 5/76 | (2006.01) | |
| H04N 21/845 | (2011.01) | |
| G11B 27/30 | (2006.01) | |
| H04N 5/85 | (2006.01) | |
| H04N 21/44 | (2011.01) | |
| H04N 21/84 | (2011.01) | |
| G06F 17/30 | (2006.01) | |
| G06K 9/00 | (2006.01) | |

(52) U.S. Cl.
CPC ...... *H04N 21/8456* (2013.01); *G06F 17/30793* (2013.01); *G06K 9/00221* (2013.01); *G06K 9/00744* (2013.01); *G11B 27/3027* (2013.01); *H04N 5/85* (2013.01); *H04N 21/44008* (2013.01); *H04N 21/84* (2013.01)

(58) Field of Classification Search
CPC .............................. G11B 27/3027; H04N 5/85
USPC .......... 386/239, 241, 278, 282, 248; 382/103, 382/159, 190, 225
See application file for complete search history.

(56) References Cited

U.S. PATENT DOCUMENTS

| | | | | |
|---|---|---|---|---|
| 2006/0072811 | A1* | 4/2006 | Porter et al. .................. | 382/159 |
| 2007/0279494 | A1* | 12/2007 | Aman et al. ................... | 348/169 |
| 2008/0127270 | A1* | 5/2008 | Shipman et al. ............... | 725/46 |
| 2008/0131073 | A1 | 6/2008 | Ogawa et al. | |
| 2008/0166027 | A1* | 7/2008 | Jeong et al. ................... | 382/118 |
| 2008/0260255 | A1 | 10/2008 | Fukushima et al. | |
| 2009/0110245 | A1* | 4/2009 | Thorn ........................... | 382/118 |
| 2009/0110247 | A1 | 4/2009 | Kim | |
| 2011/0249904 | A1* | 10/2011 | Mochizuki et al. ........... | 382/225 |
| 2011/0274315 | A1* | 11/2011 | Fan et al. ....................... | 382/103 |
| 2012/0008856 | A1* | 1/2012 | Hewes et al. .................. | 382/154 |
| 2012/0189284 | A1* | 7/2012 | Morrison et al. .............. | 386/282 |
| 2012/0251078 | A1* | 10/2012 | Leichter et al. ............... | 386/278 |

* cited by examiner

*Primary Examiner* — Thai Tran
*Assistant Examiner* — Mishawn Dunn
(74) *Attorney, Agent, or Firm* — McClure, Qualey & Rodack, LLP (57) ABSTRACT

Systems and methods of processing video streams are described. A face is detected in a video stream. The face is tracked to determine a video clip associated with one of a plurality of individuals. The video segment is assigned to a group of video clips based on the associated individual. A significant face is detected in the group of video clips when the detected face meets one or more significance criteria. The significance criteria describes a face-frame characteristic. A representation of the significant face is displayed in association with a representation of the group of video clips. The order of the significance criteria is adjusted through a user interface.

20 Claims, 11 Drawing Sheets

SYSTEMS AND METHODS OF DETECTING SIGNIFICANT FACES IN VIDEO STREAMS

CROSS REFERENCE TO RELATED APPLICATIONS

Not applicable.

TECHNICAL FIELD

The present disclosure generally relates to processing of video streams and more particularly relates to systems and methods for detecting significant faces in video streams.

BACKGROUND

With the widespread use of digital cameras, many individuals turn to image management tools to archive and organize their digital photographs and video clips. Image management tools found on the market offer various features, including image organization. The organized images may then later be viewed by the individual or published for others to view. A user may also use image management tools to locate images of a particular individual within a collection of photographs or video clips, by viewing each photograph or clip and tagging it (e.g., with an individual's name). Conventional approaches to tagging require a user to open a particular photograph or to play a video clip in order to locate a particular individual. When a large volume of photographs or clips is involved, this process is time consuming, since each photograph or clip may contain multiple individuals, some of whom are not important to the viewer.

SUMMARY

Various embodiments are described for detecting significant faces within video streams and using the detected significant faces to view the streams. One embodiment is a method performed by a computer that is specifically programmed to execute the method steps. The method includes detecting at least one face in a video stream. The method further includes tracking the face to determine a video clip associated with one of a plurality of individuals. The method further includes assigning the video segment to a group of video clips based on the associated individual. The method further includes detecting at least one significant face in the group of video clips when a detected face meets one or more significance criteria. A significance criteria is associated with a face-frame characteristic, and the criteria is a description of how this characteristic determines significance or lack of significance. One example of a face-frame characteristic is the size of the face relative to the frame, and one example of significance criteria that uses this characteristic is that a large face is considered to be significant. The method further includes displaying a representation of the significant face in association with a representation of the group of video clips. The method further includes adjusting the order of the significance criteria through a user interface.

Another embodiment is a computing device that includes a memory and a processor. The processor is configured by instructions retrieved from the memory to detect at least one face in a video stream. The processor is further configured to track the at least one face to determine at least one video clip associated with one of a plurality of individuals. The processor is further configured to assign the at least one video clip to a group of video clips based on the associated one individual. The processor is further configured to detect at least one significant face in the group of video clips when the face meets one or more significance criteria. The significance criteria describes a face-frame characteristic. The processor is further configured to display a representation of the at least one significant face in association with a representation of the group of video clips. The processor is further configured to adjust an order of the one or more significance criteria through a user interface.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications, and equivalents included within the spirit and scope of the disclosure as defined by the appended claims.

As discussed above, locating images of particular individuals within a collection of media (e.g., digital photographs, digital video recordings, etc.) can be time-consuming when each media instance is opened for viewing. Various embodiments of video stream display systems and methods described herein identify significant faces within stored video streams. Some of these embodiments also use the significant faces to organize the images, and to browse through or view images.

As further described below, these various embodiments detect faces in one or more video streams, and detect which faces are significant. Associations between the video streams and significant faces are created and stored, so that the video streams can be organized by significant faces rather than strictly by stream, file, folder, etc. In this way, a user can easily browse among significant faces to view a representation of each stored video stream that includes a particular significant face. In some cases, the representation may be an image extracted from the video stream, but at a reduced size (e.g., a thumbnail). When browsing among videos that contain a significant face, a user can select a particular video stream for playback. The playback may begin at the point in the stream where the thumbnail was taken.

As used herein, a significant face is one having one or more particular face-frame characteristics which meet a significance criteria that is appropriate for the particular face-frame characteristic. As used herein, a face-frame characteristic is a characteristic of the face relative to the frame and/or the video stream, and is derived from the face and the frame(s) in which the face appears. Some face-frame characteristics relate to the face itself, and in such cases the significance criteria is related to the face itself (e.g., significant when face fills at least a certain percentage of the frame). Other face-frame characteristics relate to the body associated with the face, and in such cases the significance criteria is related to the body (e.g., significant when body is wearing shoes). Still other face-frame characteristics relate to movement of the face or the body between frames in the video stream, and in such cases the significance criteria is related to movement (e.g., significant when face moves between frames). Other face-frame characteristics relate to audio associated with the frames in which faces appear, and in such cases the significance criteria is related to audio (significant when the frame includes audio). Examples of face-frame characteristics and corresponding significance criteria will now be discussed.

One example face-frame characteristic is the size of the face relative to the size of the frame. This relative size may be expressed as a percentage of the frame that is covered by the face. An example significance criteria for the relative face size characteristic is that a face is significant when it takes up a large portion of the frame.

Another example face-frame characteristic is the face's degree of focus as compared to other objects in the frame. This degree of focus can be expressed as how sharp the face is, relative to other parts of the frame. This degree of focus may be viewed from an optical glance perspective. An example significance criteria for the degree of focus characteristic is that a face is significant when it is generally in-focus. Another example face-frame characteristic is the face's resolution. An example significance criteria for resolution characteristic is that a face is significant when the frame containing the face is high resolution relative to the capabilities of the camera. As one example, if the camera capabilities include 1 MB of pixels, 2 MB of pixels, 4 MB of pixels, and 8 MB of pixels, then 8 MB may be considered high resolution, so that faces in frames taken at 8 MB resolution are considered significant.

Another example face-frame characteristic is the orientation of the face within the frame, as compared to other faces within the frame. An example significance criteria for the orientation characteristic is that an individual facing the camera is considered to have a significant face. Another significance criteria for the orientation characteristic is that an individual with his head turned away from the camera is not considered to have a significant face. Another example face-frame characteristic is position of the face within a frame. An example significance criteria for the face position characteristic is that a centered face is considered significant, as camera users often center the photo with the important subject in the center.

Another example face-frame characteristic is the face's presence or absence within a predefined area of the frame. An example significance criteria for the predefined area characteristic is that a face in the center of the frame is considered to be a significant face, as camera operators often center the photo with the important subject in the center. Another example significance criteria for the predefined area characteristic is that a face on the left or right side of the frame is considered to be a significant face, as a host is typically seated on the left or right side rather than in the middle.

Yet another example face-frame characteristic is a quantitative measure of the face's appearance within the video stream. An example significance criteria for the quantitative characteristic is that when a face appears in a number of frames that exceeds a predefined threshold, that face is considered significant. Other quantitative measures include the amount of time or the frequency of appearance, rather than then number of frames. The quantitative measure may be expressed as a proportion of the whole, e.g., a face that appears in 8 of 10 frames may be considered to be significant, while a face that appears in 8 of 100 frames may not be considered significant.

Still another example face-frame characteristic is the number of individuals within the frame. An example significance criteria for this characteristic is a user preference for individual, group, or theme. That is, the user may specify that frames with individuals are to be considered significant, or that frames with groups are to be considered significant, or that frames with themes are to be considered significant. Another example significance criteria for this characteristic is that when the number of faces in a frame exceeds a predefined threshold, those faces are considered significant. For example, a frame containing seven faces might treat all of the faces as significant. Another example significance criteria for this characteristic is that when the number of faces in frame is under a predefined threshold, those faces are considered significant. For example, in a frame in which two faces are detected, both might be considered significant, while if the frame contains seven faces, none of them might be considered significant.

Other face-frame characteristics relate to features of the face, such as the presence or absence of a smile on the face. An example significance criteria for the smile characteristic is that a face with a smile is considered significant. Another example significance criteria for the smile characteristic is that a face without a smile is considered significant. Facial features other than a smile, for example an open mouth or eyes that are closed may be also used to determine that a face is significant. Yet another example of a characteristic related to the face itself is movement within the face, such as the appearance of a smile, a mouth opening, eyes opening, or any movement within the face that is an indicator of significance.

Still other face-frame characteristics relate to the body associated with the face. An example of a body characteristic is the size of the body. An example significance criteria for the body characteristic is that a face is considered significant when associated with a large body, relative to other bodies in the frame. Still other criteria may be used which are related to features of the body associated with the face. An example of such a body feature is the shoes worn by the individual. An example significance criteria for the shoes characteristic is that an individual with shoes that are parallel to other individuals in the frame is considered to have a significant face. Another example significance criteria for the shoes characteristic is that an individual with shoes which are positioned lower in the frame relative to other individuals is considered to have a significant face.

Still other face-frame characteristics relate to audio associated with a frame. An example of an audio characteristic is the presence or absence of audio associated with the frame. An example significance criteria for the audio characteristic is that a face is considered significant when present in a frame that has associated audio. Another such audio characteristic may be volume, or a change in volume between frames. An example significance criteria for the volume characteristic is that when a frame has associated audio which has increased in volume between frames, all of the faces in that frame are considered significant. Another example significance criteria for the volume characteristic is when a frame has associated audio with a loud volume, all of the faces in that frame are considered significant. Another such audio characteristic may be a change in the audio rhythm between frames. One example of audio rhythm is speech cadence. An example significance criteria for the rhythm characteristic is that when a frame is associated with speech that has increased in cadence (e.g., the speaker is talking faster), all the faces in that frame are considered significant.

Other face-frame characteristics relate to movement between the frames of the video stream. An example of a movement characteristic is movement of a face. An example significance criteria for the face movement characteristic is that a face which moves its position from one frame to another is considered significant. Another example of a movement characteristic is movement of the body associated with a face. An example significance criteria for the body movement characteristic is that when the body associated with the face moves its position from one frame to another, the face is considered significant. Some criteria may further require the body to move a threshold amount before being considered significant. As yet another example, a face may be considered significant when the body associated with the face is moving fast or is moving slow. Another example significance criteria for the body movement characteristic is that when the body moves fast relative to a threshold, the face is considered significant. Yet another example significance criteria for the body movement characteristic is that when the body moves slow relative to a threshold, the face is considered significant.

As used herein, "video streams" also includes multimedia streams, in which video is intermixed with audio, graphics, and/or data streams. Furthermore, although the techniques are mainly described with reference to a stored video stream which contains multiple frames, the techniques are also applicable to single frame images (e.g., a digital still photograph). That is, embodiments are contemplated that detect significant faces in a collection of single frame images, and that organizes and displays these images based on significant faces rather than strictly by file or folder.

Figure 1:
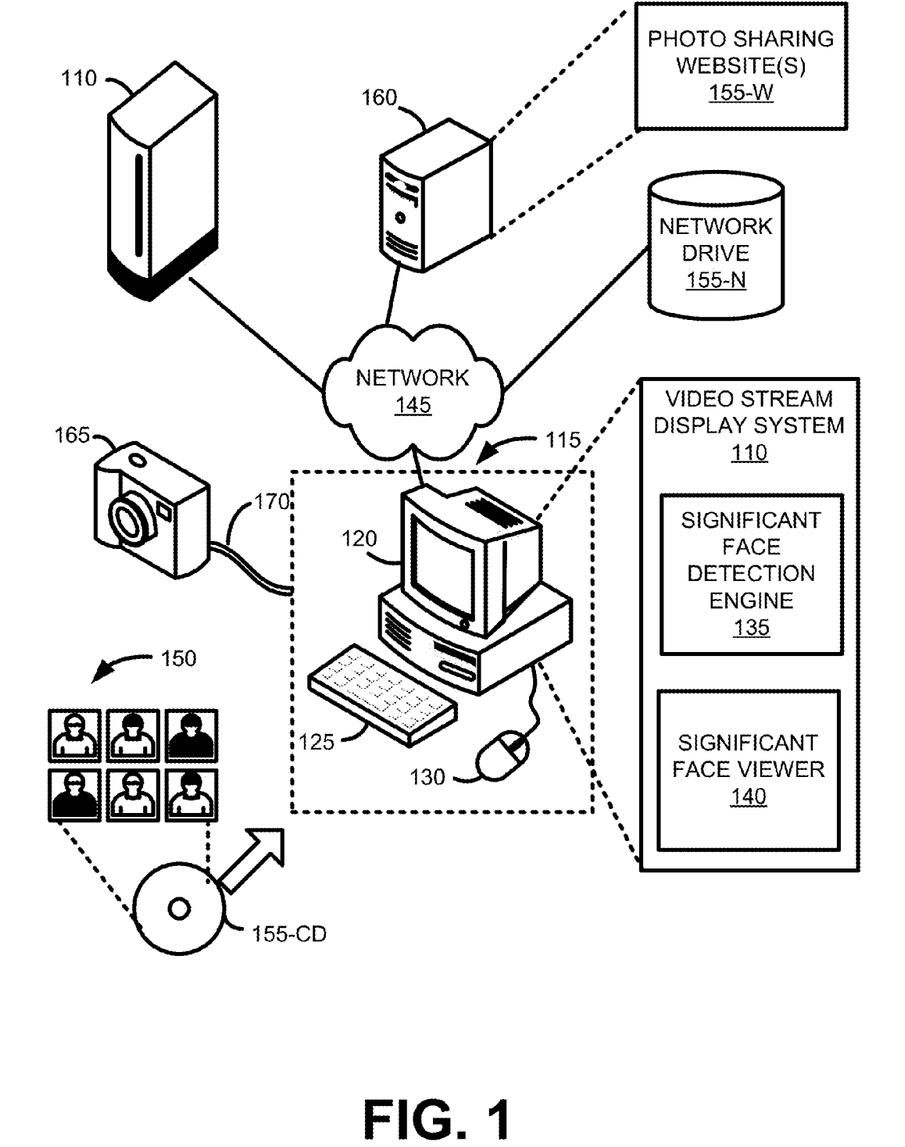
FIG. 1 is a high-level block diagram of a system including a video stream display system, according to some embodiments.

FIG. 1 is a high-level block diagram of a system including a video stream display system. The system includes a video stream display system 110 embodied in a computing device 115 (e.g., a desktop computer, computer workstation, laptop, notebook, or a personal electronics device such as a media player, game player, phone, or messaging device). Video stream display system 110 includes a display 120 and input devices such as a keyboard 125 and/or a pointing device 130. Video stream display system 110 also includes a significant face detection engine 135 and a significant face viewer 140, each of which can be implemented in software (i.e., by instructions executing on a processor), in specialized hardware logic, or a combination thereof. Having introduced example functionality that is provided by significant face detection engine 135 and significant face viewer 140 introduced above, these components will now be described in more detail.

In some embodiments, video stream display system 110 is coupled via a wired or wireless communication path to a network 145, such as the Internet or a local area network (LAN). Video stream display system 110 retrieves video streams 150 and processes the streams 150 to detect significant faces. In some embodiments, video streams 150 are retrieved from a local or remote storage device. Examples of local storage include a compact disc (CD) reader 155-CD and a flash drive (not shown). Examples of remote storage include a network drive 155-N, another video stream display system 110, or a photo sharing website 155-W that is hosted on a server 160. In some embodiments, video streams 150 are provided to video stream display system 110 by an image capture device 165, such as a digital camera, via an interface or connection 170.

Video stream display system 110 may support a number of conventional computer interfaces, such as (but not limited to) IEEE-1394 High Performance Serial Bus (Firewire), universal serial bus (USB), a serial connection, and a parallel connection. As one of ordinary skill will appreciate, video streams 150 may be encoded in any number of formats, including (but not limited to) JPEG (Joint Photographic Experts Group) files, TIFF (Tagged Image File Format) files, PNG (Portable Network Graphics) files, GIF (Graphics Interchange Format) files, and BMP (bitmap) files.

Figure 2:
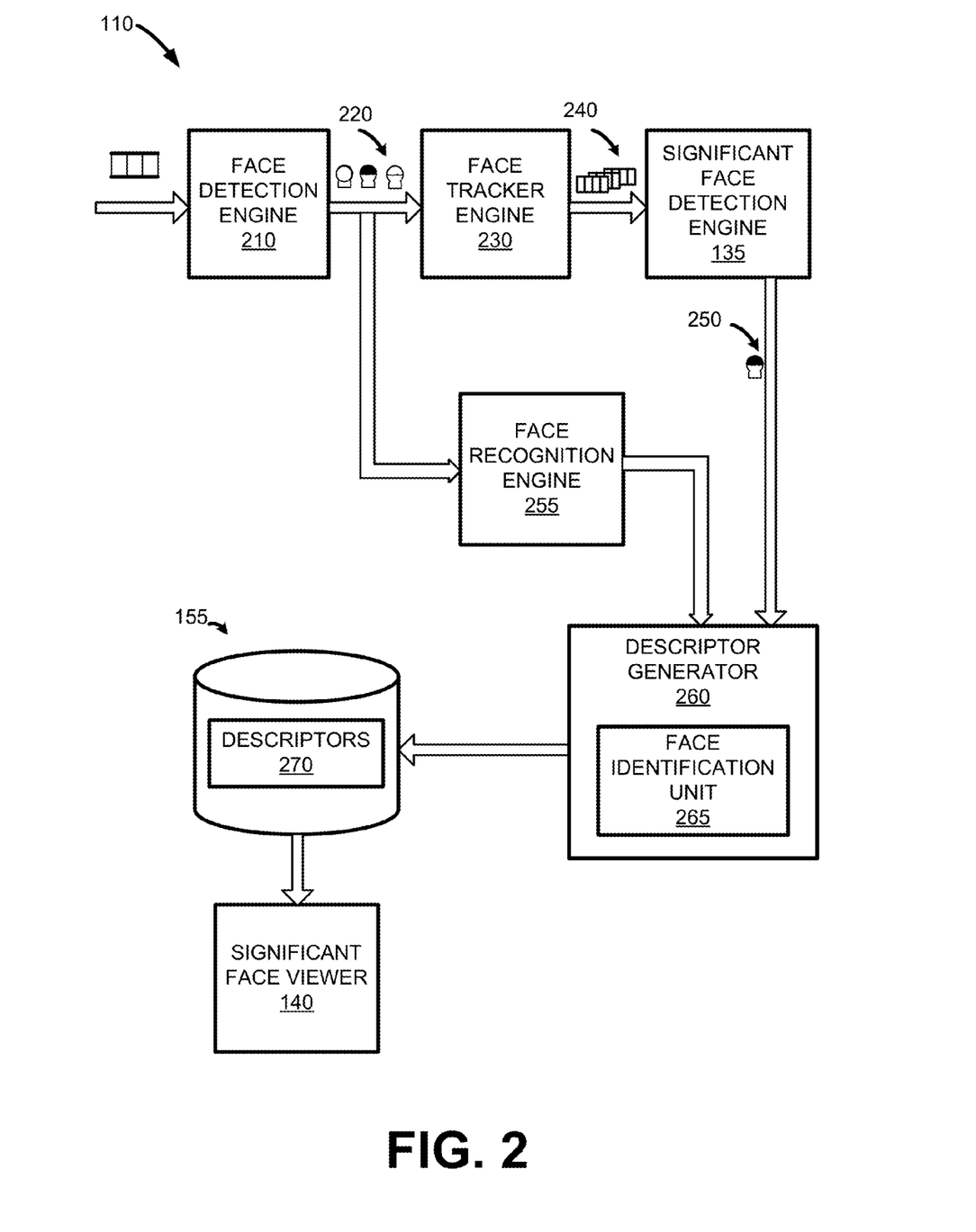
FIG. 2 is a block diagram illustrating selected components of the video stream display system from FIG. 1, according to some embodiments.

FIG. 2 is a block diagram illustrating selected components of video stream display system 110, and the interaction between these components. A face detection engine 210 receives a video stream 150 from storage device 155 or image capture device 165 as described in connection with FIG. 1. Face detection engine 210 uses image processing techniques to detect one or more faces 220 contained in the frames that make up a stream 150. A face tracker engine 230 tracks a particular face (or the appearance of a face) across one or more video frames to determine a set of video clips 240 containing the face of a particular individual. In this manner, face tracker engine 230 groups frames within a video stream 150 into different sets 240, based on the presence of a particular face.

Face tracker engine 230 may use, for example, backward tracking or motion object tracking. One example of tracking involves noting when the individual takes a particular action related to the face, such as an action that brings more of the face into view, an action that moves an object obscuring the face, or any action that makes the face easier to recognize. Such actions may include, for example, an individual turning to face the camera, taking off a hat, or moving closer to the camera. Having noted this action, the face tracker engine 230 can then examine those frames that are earlier in time (i.e., tracking "backward") to find the first occurrence of that individual in the video. Backward tracking may include tracking an object, for example, tracking an individual's head and then using the head position to determine the body.

In this manner, the face tracker engine 230 determines a set of frames in which a particular individual appears. Various embodiments assign frames into to sets 240 based on, for example, time, object color, or face characteristics.

Significant face detection engine 135 receives video clip set 240, then uses one or more criteria to determine whether a particular detected face within video clip set 240 is a significant face 250. Significance criteria were introduces above and are discussed further in connection with FIG. 4. A descriptor generator 260 produces information about these significant face(s) 250, in the form of one or more descriptors 270. Descriptor generator 260 also associates descriptors 270 with video stream 150 and/or a video segment within set 240 and stores descriptors 270 (e.g., in storage device 155).

Significant face viewer 140 uses the descriptors to present an interface which allows a user to browse among significant faces 250 and to find those video segments 240 that are associated with a particular significant face 250. In some embodiments, significant face viewer 140 allows a user to start playback of a selected video segment 240 that contains a significant face 250.

In some embodiments, significant face viewer 140 is a standalone browser or viewer. In other embodiments, significant face viewer 140 is a plug-in to, or an extension to, or an add-on component of, a conventional media browser, media viewer, file explorer, or desktop explorer. In such embodiments, the functionality of the conventional software is extended to be a significant face viewer 140.

Some embodiments include a face recognition engine 255 which determines face characteristics by detecting one or more faces 220 contained within the frames. In such embodiments, a face identification unit 265 is associated with the descriptor generator 260. The face characteristics provided by face recognition engine 255 are stored in the face identification unit 265. A user can then browse, search for, or filter particular individual(s) based on face characteristics.

Figure 3:
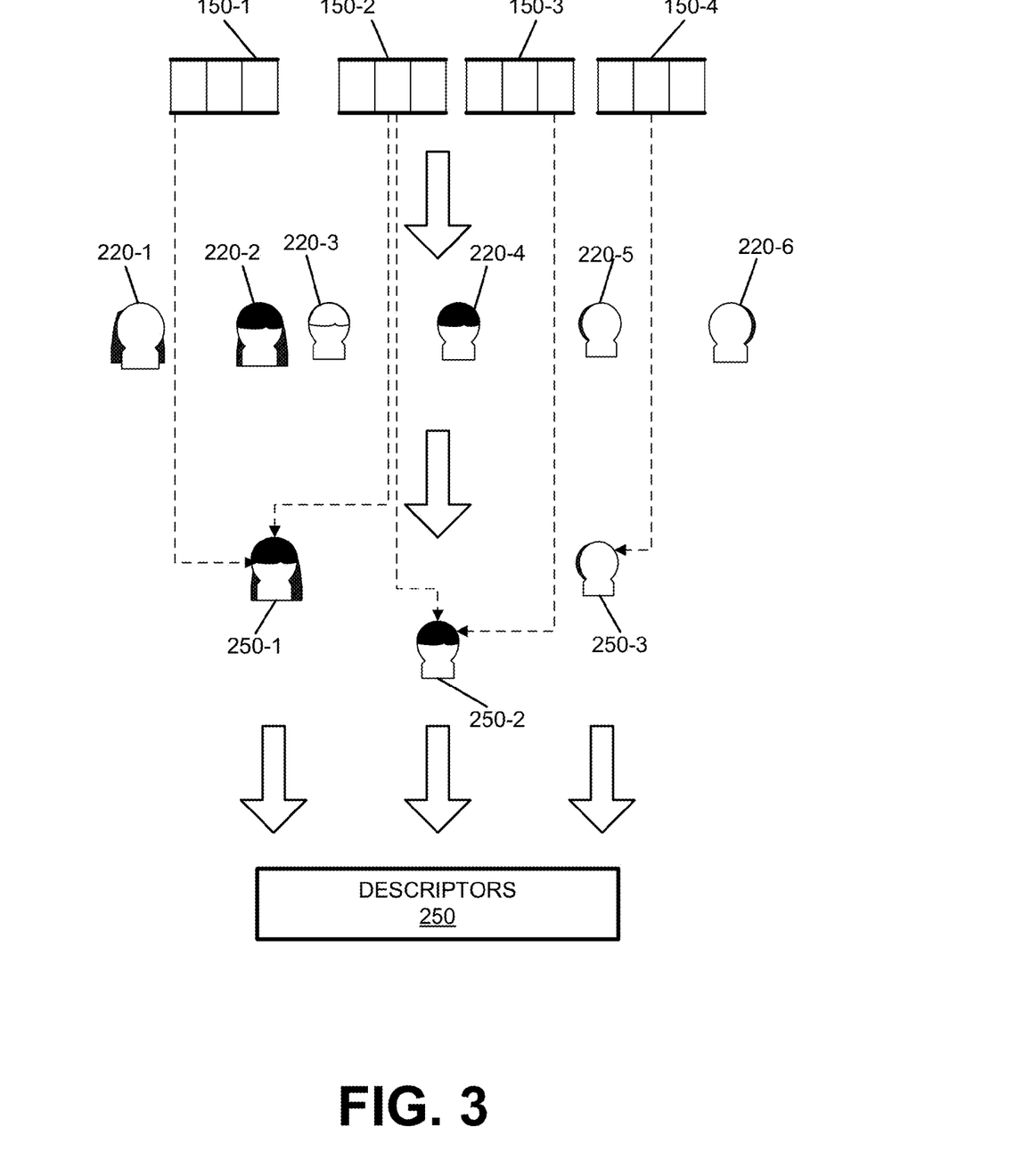
FIG. 3 illustrates an example of relationships or associations between video streams and significant faces that is produced by the interaction of the components in FIG. 2, according to some embodiments.

FIG. 3 illustrates an example of relationships or associations between video streams 150 and significant faces 250-1 . . . 250-3. These relationships or associations are produced by the interaction of the components in FIG. 2, and are stored in descriptors 270. In this particular example, video stream display system 110 processes four video streams (150-1 . . . 150-4) and detects six faces (220-1 . . . 220-6), three of which are determined to be significant faces (250-1 . . . 250-3). As indicated by the dashed lines, significant face 250-1 appears at the first frame of stream 150-1 and the second frame of stream 150-2; significant face 250-2 appears in the second frame of stream 150-2 and the third frame of stream 150-3; and significant face 250-3 appears in the second frame of stream 150-4. A particular stream may contain more than one significant face, and in fact, a particular frame may contain more than one significant face.

Figure 4:
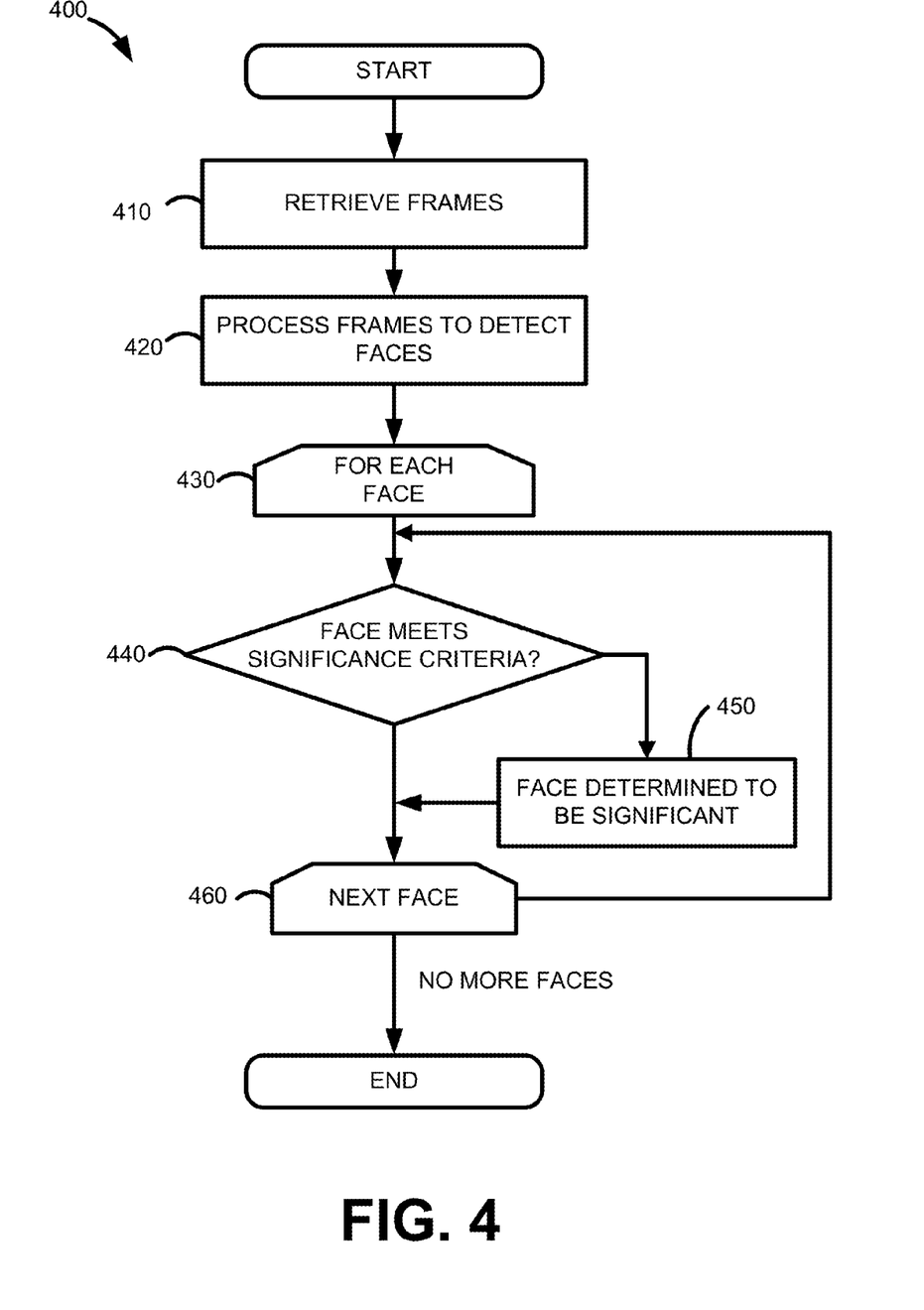
FIG. 4 is a flowchart describing a representative method performed by some embodiments of the face detection engine and the significant face detection engine from FIG. 2.

FIG. 4 is a flowchart describing a representative method performed by some embodiments of significant face detection engine 135 and face detection engine 210. Method 400 begins at block 410 where one or more frames within a video stream 150 are retrieved. At block 420, the retrieved frame(s) are processed in order to identify objects in the frame(s) and to further recognize whether any of these objects are a human face. A person of ordinary skill should appreciate various techniques that can be used to recognize a face object, such as edge detection within a frame, binary pattern-classification in conjunction with a trained classifier, object tracking between frames, etc.

Block 430 begins an iteration loop to process multiple detected faces. At block 440, a determination is made as to whether a detected face meets one or more significance criteria associated with a face-frame characteristic. If the detected face does not meet the criteria, then the iteration moves to another face at 460. If the detected face does meet the one or more criteria, then the face is determined to be significant at block 450. The iteration moves to another face at 460, and determines at block 440 whether the next face meets the criteria. When all faces have been processed, the method ends. In some embodiments, method 400 is repeated for multiple video streams 150.

Each significance criteria applies to a particular face-frame characteristic. That face-frame characteristic, derived from the face and the frame in which the face appears, is a characteristic of the face relative to the frame and/or the video stream. Various examples of face-frame characteristic and significance criteria were given above. Criteria may be associated with a user-defined, predetermined, and/or fixed threshold. For example, the relative size criteria may be 20% so that a face that takes up more than 20% of the frame is a significant face. As another example, the time threshold may be 10% so that a face that appears for a total of 10 seconds in a 90 second segment is a significant face.

Although the flowchart of FIG. 4 describes method 400 in terms of a single video stream or segment of a stream, method 400 can be extended to apply to multiple video streams or segments. The set of video segments or streams can be defined in various ways. In some embodiments, method 400 is performed on all video streams or segments in a specific location (e.g., directory, drive, user account on a website, imaging device, etc.). In some embodiments, a user selects the video streams or segments for which significant face detection is performed.

Figure 5:
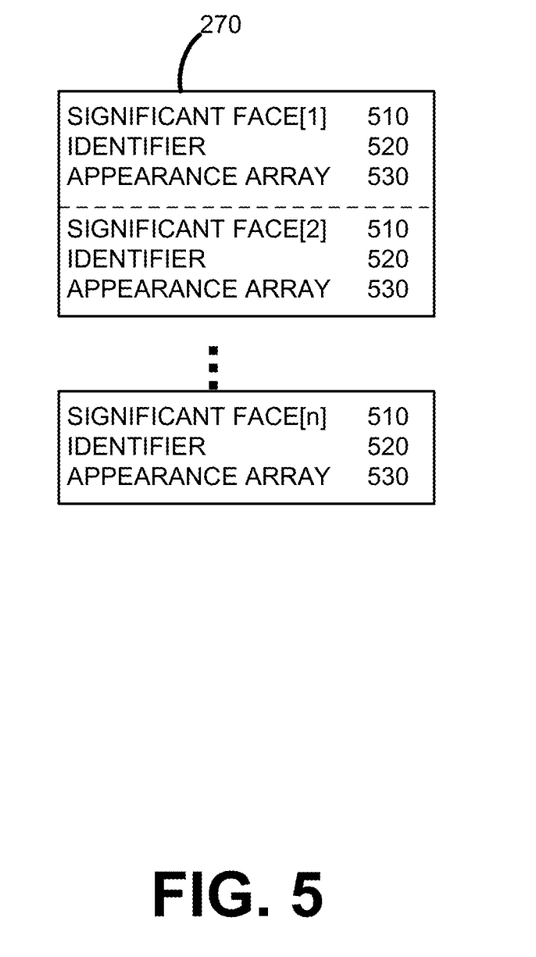
FIG. 5 is a block diagram showing example structure for a descriptor that captures information about significant faces in a video stream, according to some embodiments.

FIG. 5 is a block diagram showing example structure for a descriptor 270 that captures information about significant faces 250 in a video stream 150. In some embodiments, descriptor 270 is stored as part of stream 150, while in other embodiments descriptor 270 is stored separately. In the example embodiment of FIG. 5, descriptor 270 includes an array of SignificantFace structures (510), one for each significant face that was detected in stream 150. Each SignificantFace structure 510 includes an identifier field (520) and appearance arrays (530). Identifier field 520 serves to distinguish one significant face from another. A person of ordinary skill in the art should appreciate that identifier field 520 can take a variety of forms, such as an ordinal integer, a text string, a randomly generated unique identifier, etc.

Descriptor generator 260 utilizes an appearance locator which, given information about a significant face, determines which frames the significant face appear in. Such frames are known as appearance frames. Information about appearance frame is stored in an appearance array 530, which identifies a particular frame within stream 150 where this significant face (i.e., SignificantFace[0]) appears. A person of ordinary skill in the art should appreciate that the appearance frame may be described in terms of a frame sequence number within stream 150, a time code within stream 150, a unique frame identifier, etc. In some embodiments, the appearance locator is part of descriptor generator 260, while in other embodiments, the appearance locator is part of significant face detection engine 135.

Figure 6:
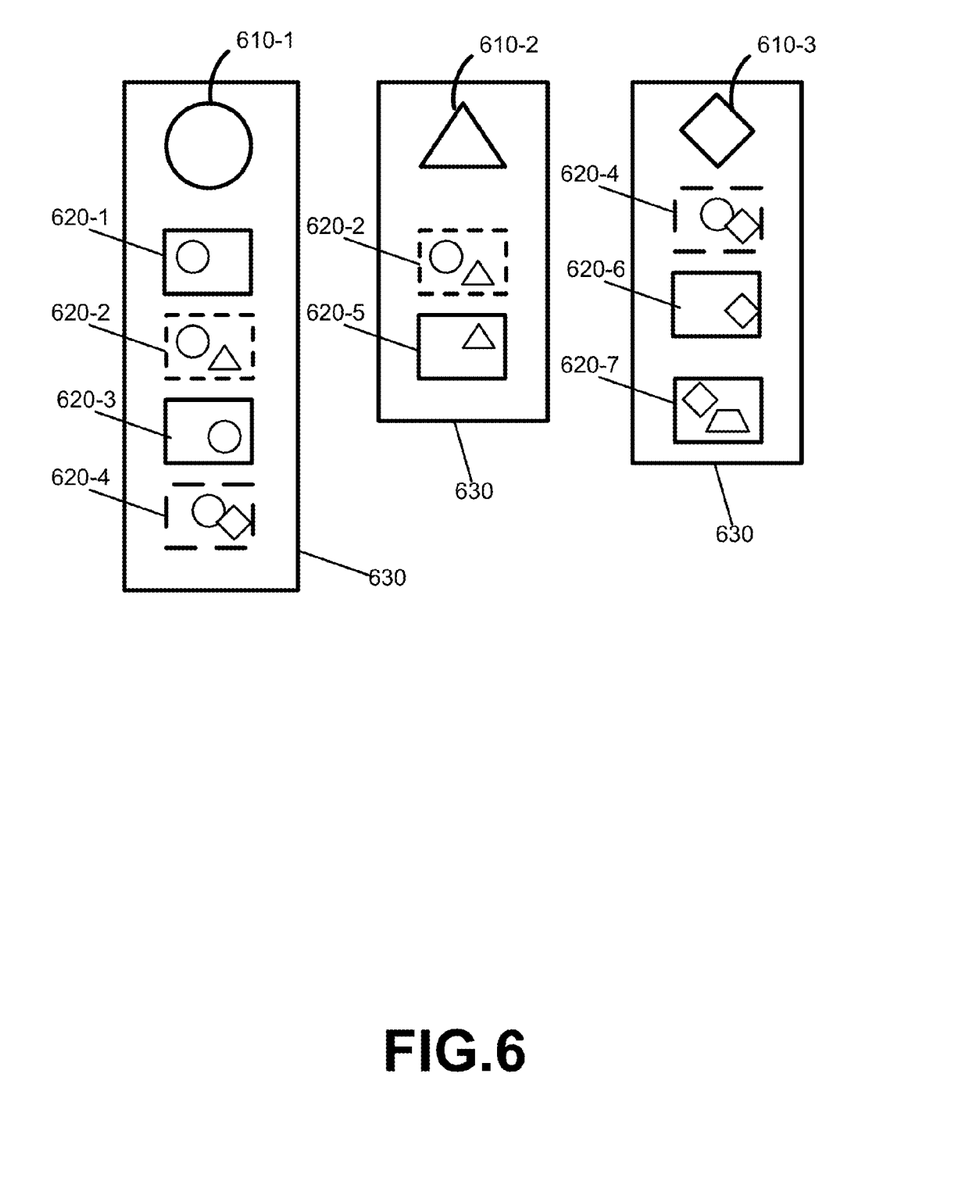
FIG. 6 is a diagram of an example embodiment of a user interface which displays significant faces and allows browsing among video streams that contain these faces, according to some embodiments.

FIG. 6 is a diagram of an example embodiment of significant face viewer 140 which displays significant faces and allows browsing among video streams that contain these faces. In some embodiments, significant face detection is performed before significant face viewer 140 begins display, and significant face viewer 140 utilizes stored information produced by descriptor generator 260. In other embodiments, significant face detection is performed contemporaneously with the display provided by significant face viewer 140.

As seen in FIG. 6, significant face viewer 140 displays a face representation 610, such as an icon, for each significant face 250 (FIG. 2.) In this example, three different significant faces are detected and displayed: 610-1; 610-2; and 610-3. Along with the face representation 610 of a particular significant face 250, significant face viewer 140 displays a representation 620 of those frames within a video stream 150 in which the significant face appears. In some embodiments, face representation 610 and its associated frame representations 620 are grouped together visually, for example, appearing within the same significant face "folder" (630).

In this example: significant face 610-1 was detected in four different frames, and thus four frame representations 620 are displayed along with significant face 610-1: frames 620-1, 620-2, 620-3, and 620-4. Also, significant face 610-2 was detected in two different frames: 620-2 and 620-5. Note that one of these frames, 620-2, also contains significant face 610-1. Thus, frame representation 620-2 is found in the group for face 610-1 and in the group for face 610-2. Finally, significant face 610-3 was detected in three different frames: 620-4, 620-6, and 620-7. This is another instance of more than one significant face appearing in a frame: frame 620-4 contains face 610-1 as well as face 610-3, and so is found in two groups.

In some embodiments, when more than one significant face appears in a frame, the frame representation 620 is displayed with a visual indicator so that the user can easily spot all instances of the same frame. For example, in FIG. 6 instances of the same frame are displayed with the same outline or border: both instances of frame 620-2 (in the group for face 610-1 and in the group for face 610-2) are displayed with a dashed line border. Similarly, both instances of frame 620-4 (in the group for face 610-1 and in the group for face 610-3) are displayed with a different dashed line border.

Visual indicators may also be used to show which frames appear in the same video segment. In some of these embodiments, the same-frame or same-stream visual indicator is shown at the request of the user. For example, the user may select a particular frame representation 620, and then input a command that causes all instances of that frame to be displayed with the appropriate visual indicator, or another command that causes all instances of that video segment to be displayed with the appropriate visual indicator.

Significant face viewer 140 may also distinguish among different frame representations 620 by basing the visual representation on various characteristics. For example, the representation may be based on size of the face, such that when the significant face is larger in frame A than in frame B, the frame representation 620 for A is larger than the frame representation 620 for B. As another example, the representation may be based on the presence of a smile on the face, such that the frame representation 620 for frames with smiling faces is represented with a smile icon while frame representation 620 for frames without a smiling face has no smile icon. As yet another example, the representation may be based on the face's orientation within the frame, e.g., frames with left facing faces may have an L indicator while frames with right facing faces may have an R indicator. The visual representation may also be based on any of the face-frame characteristics described herein.

In some embodiments, user interaction with a particular frame representation 620 allows a user to start playback of a selected video stream that contains a significant face. Thus, using the features provided by significant face viewer 140, a user can quickly determine which significant faces were detected within a set of video streams, and can quickly identify all the frames in which a particular significant face appears. Once a frame of interest is identified, the user can easily play back the relevant portion of the video stream. For example, significant face viewer 140 may allow the user to start playback at a particular frame in which a significant face appears, or slightly before the appearance.

Face representation 610 are visually distinguishable from each other, so that users can quickly identify which faces are in which frames. In some embodiments, face representation 610 takes the form of a reduced-size frame from the video stream 150 (e.g., a thumbnail). In other embodiments, face representation 610 takes the form of a user-selected portion of a frame from the video stream 150 (e.g., the user clips the frame to focus on the face). In yet other embodiments, face representation 610 takes the form of a stylized figure, face, or icon. In still other embodiments, face representation 610 takes the form of text, which might be (for example) a name or a description of the face.

As shown earlier in connection with FIG. 3, more than one significant face may appear in a given frame. In such case, the same frame representation 620 appears in conjunction with more than one face representation 610 as being located in the same folder 630.

Figure 7:
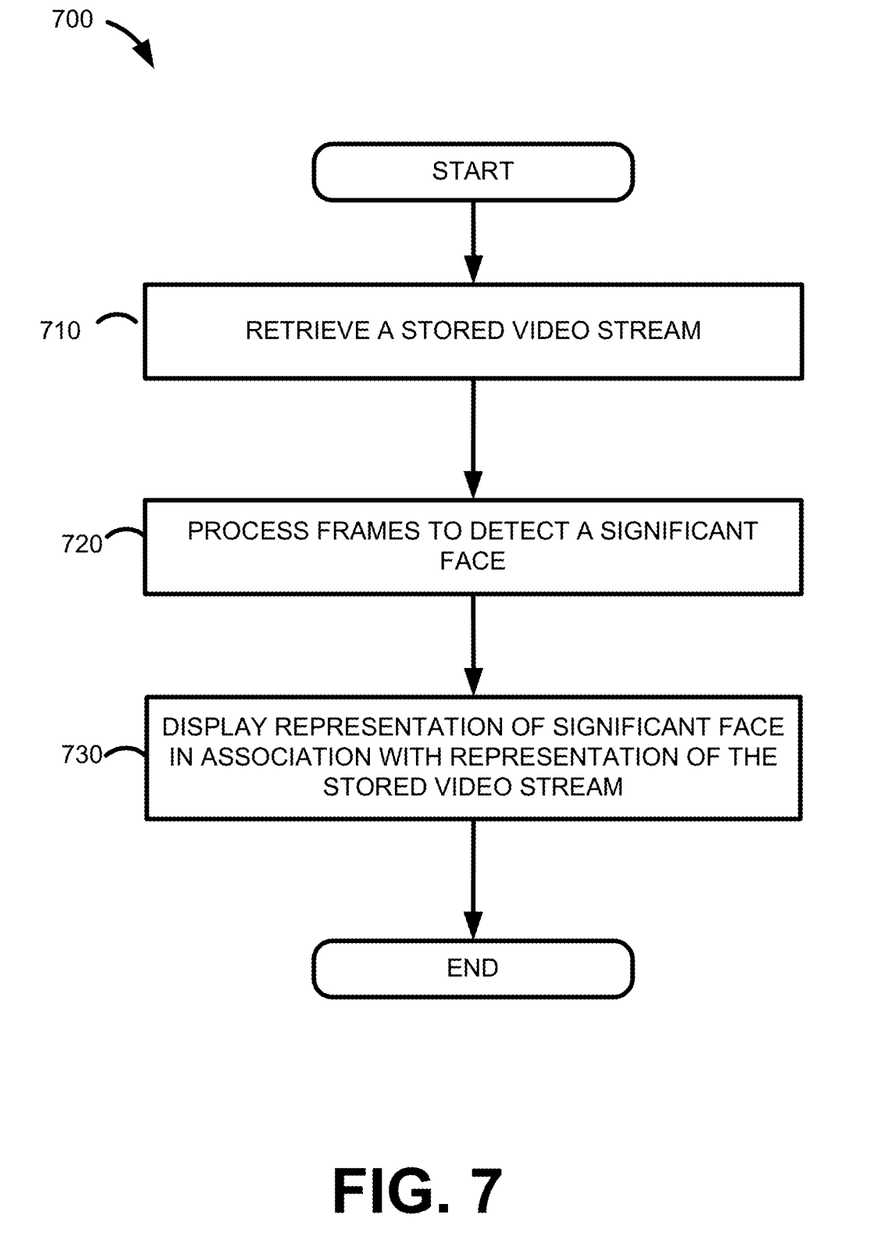
FIG. 7 is a flowchart describing a representative method performed by the video stream display system of FIG. 1, according to some embodiments.

FIG. 7 is a flowchart describing a representative method performed by some embodiments of video stream display system 110. Method 700 begins at block 710 where a stored video stream 150 is retrieved. At block 720, the frames in the retrieved stream are processed in order to detect one or more significant faces. (Techniques for determining significance were described earlier in connection with FIG. 4.) At block 730, a representation of a detected significant face (610 in FIG. 6) is displayed along with a representation of the stored video stream 150. Method 700 is then complete.

Figure 8:
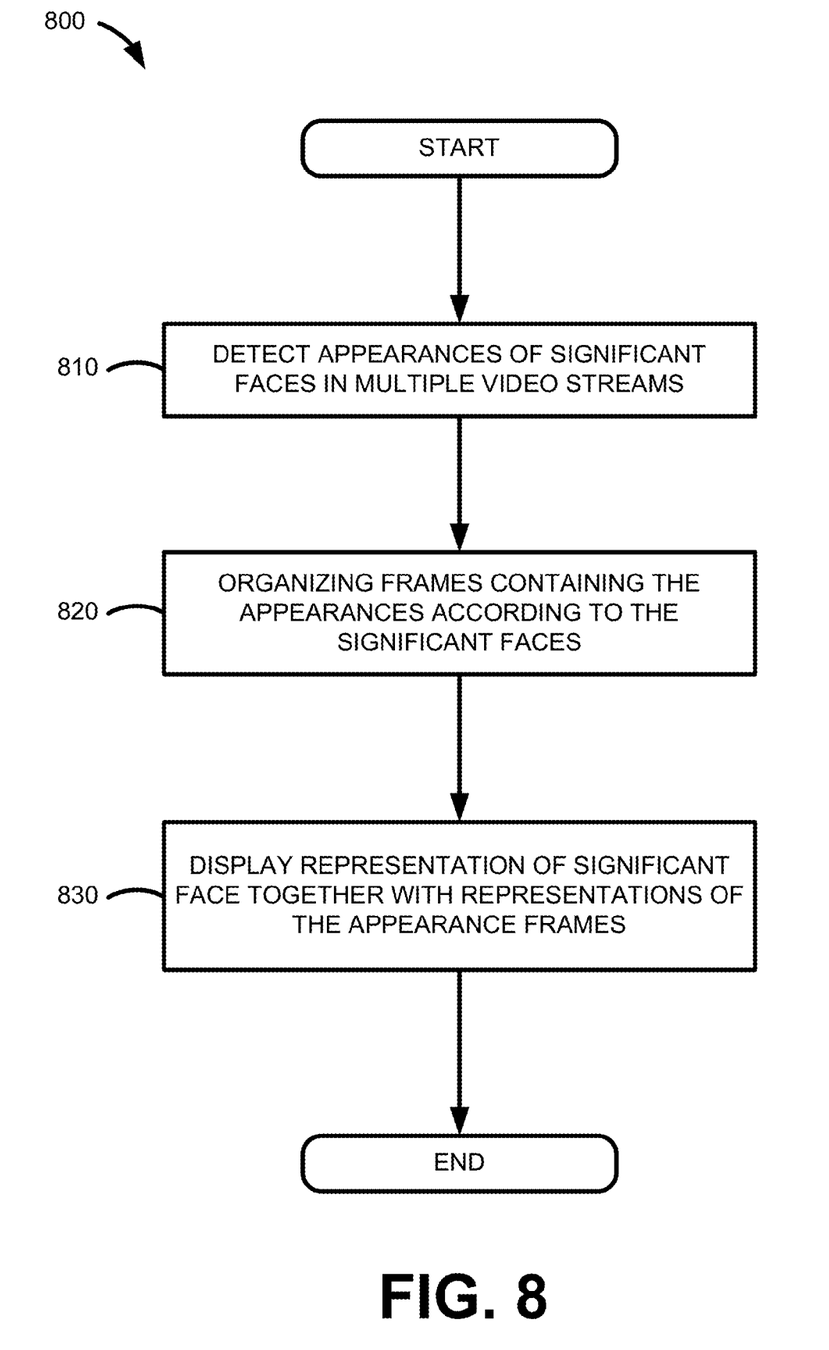
FIG. 8 is a flowchart describing a representative method performed by the video stream display system of FIG. 1, according to some embodiments.

FIG. 8 is a flowchart describing a representative method performed by some embodiments of video stream display system 110. Method 800 begins at block 810 where appearances of significant faces are detected within multiple stored video streams. At block 820, frames that contain the appearances are organized according to the significant faces, by storing associations between appearance frames and significant faces. In some embodiments, the organization is accomplished by storing identifiers of frames in which significant faces appear, in association with the significant face, or in association with an identifier of the significant face). At block 830, a representation of a detected significant face (610 in FIG. 6) is displayed along with a representation (620 in FIG. 6) of the appearance frame. The user may then interact with these representations to view significant faces and the video streams containing these faces.

Figure 9:
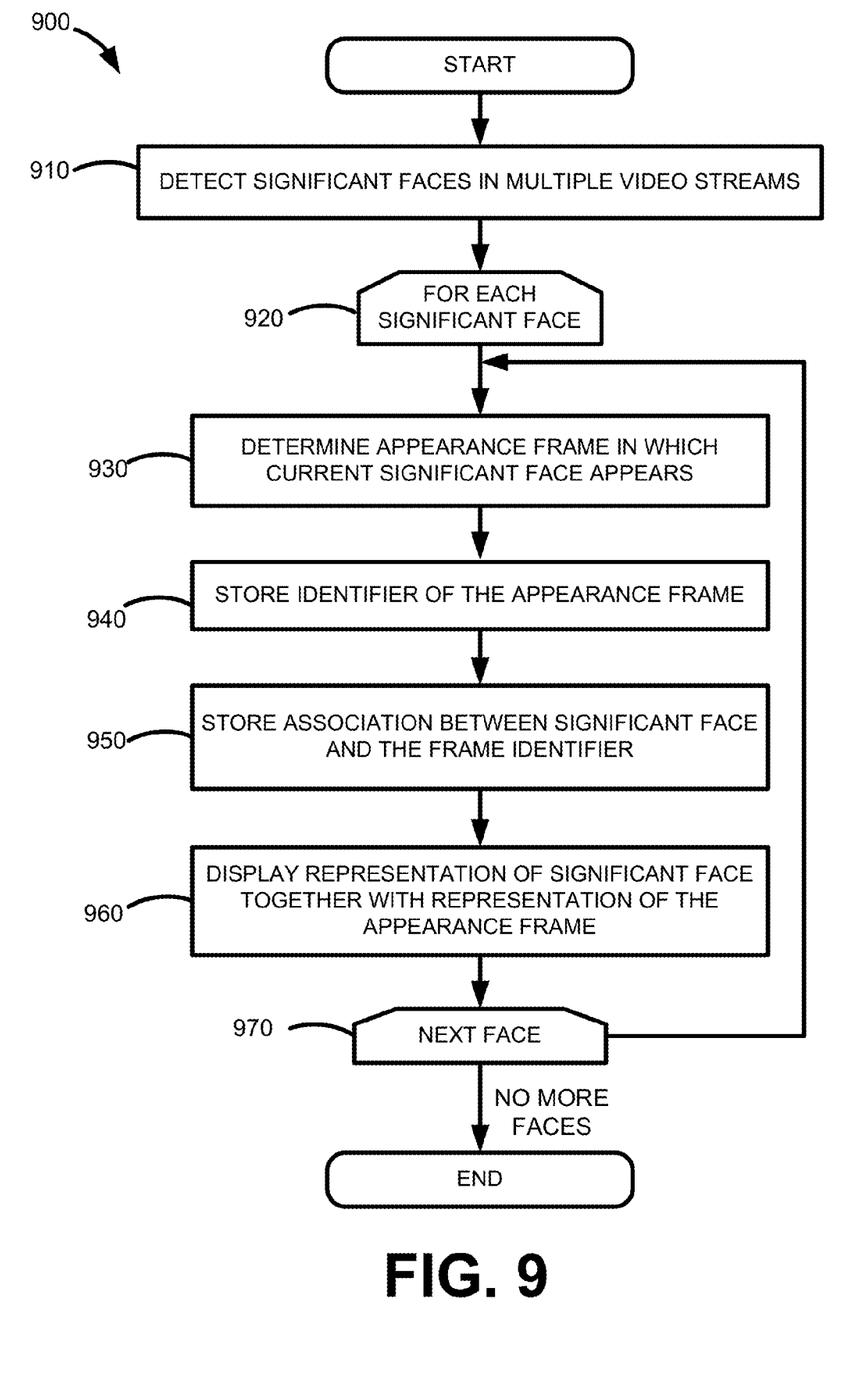
FIG. 9 is a flowchart describing a representative method performed by the video stream display system of FIG. 1, according to some embodiments.

FIG. 9 is a flowchart describing a representative method performed by some embodiments of video stream display system 110. Method 900 begins at block 910 where significant faces are detected within multiple stored video streams. Block 920 begins an iteration loop to process multiple detected significant faces. At block 930, as part of the detection, the location in which the significant frame appears in one of the video streams is determined. This is referred to herein as the appearance frame. At block 940, an identifiers for the appearance frame is stored. At block 950, an association between the current significant face and the frame identifier is stored. At block 960, a representation of a detected significant face (610 in FIG. 6) is displayed along with a representation (620 in FIG. 6) of the appearance frame. The iteration moves to another face at block 970, and when no more faces are to be processed, the method ends. The user may then interact with these representations to view significant faces and the video streams containing these faces.

Figure 10:
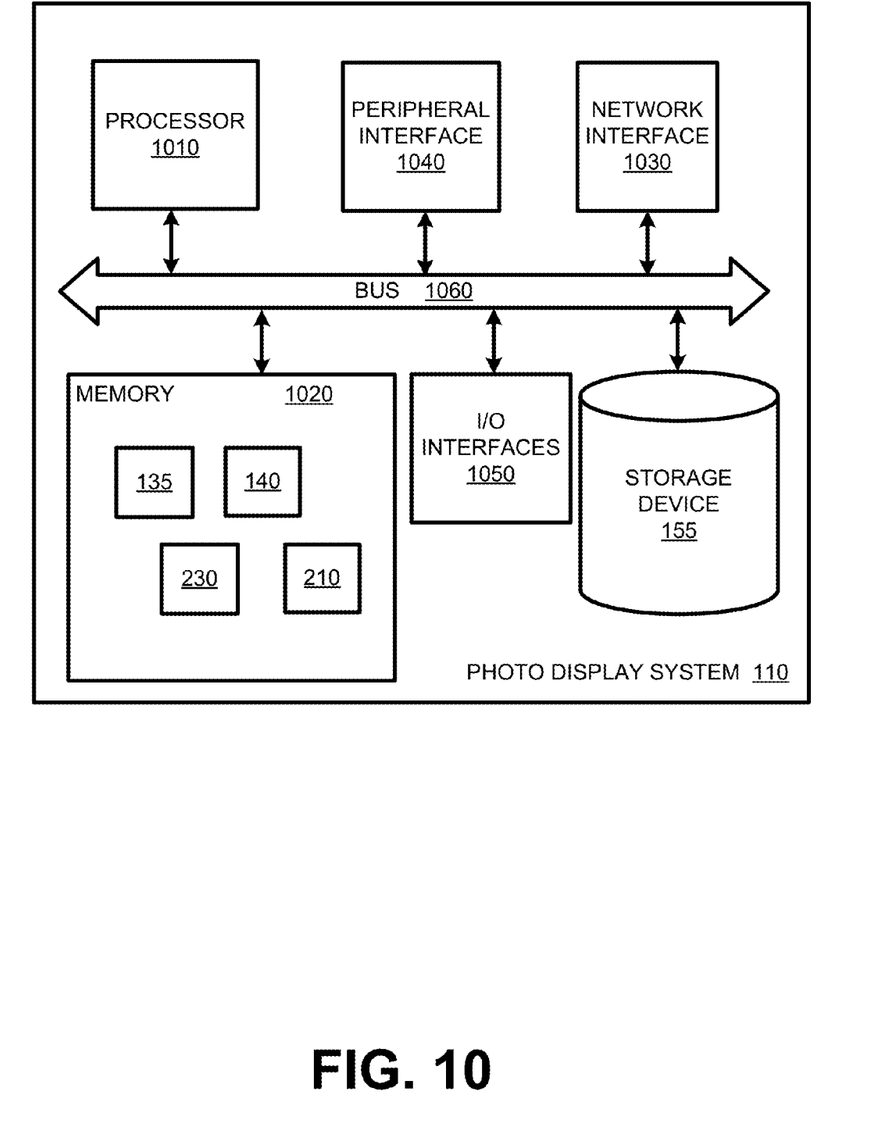
FIG. 10 is a block diagram of the video stream display system of FIG. 1, according to some embodiments.

FIG. 10 is a block diagram of video stream display system 110, according to some embodiments disclosed herein. System 110 includes a processor 1010, memory 1020, a network interface 1030, a peripheral interface 1040, a storage device 155 (e.g., non-volatile memory or a disk drive), and one or more input output (I/O) interfaces 1050. These hardware components are coupled via a bus 1060. Omitted from FIG. 10 are a number of components that are unnecessary to explain the operation of video stream display system 110.

Figure 11:
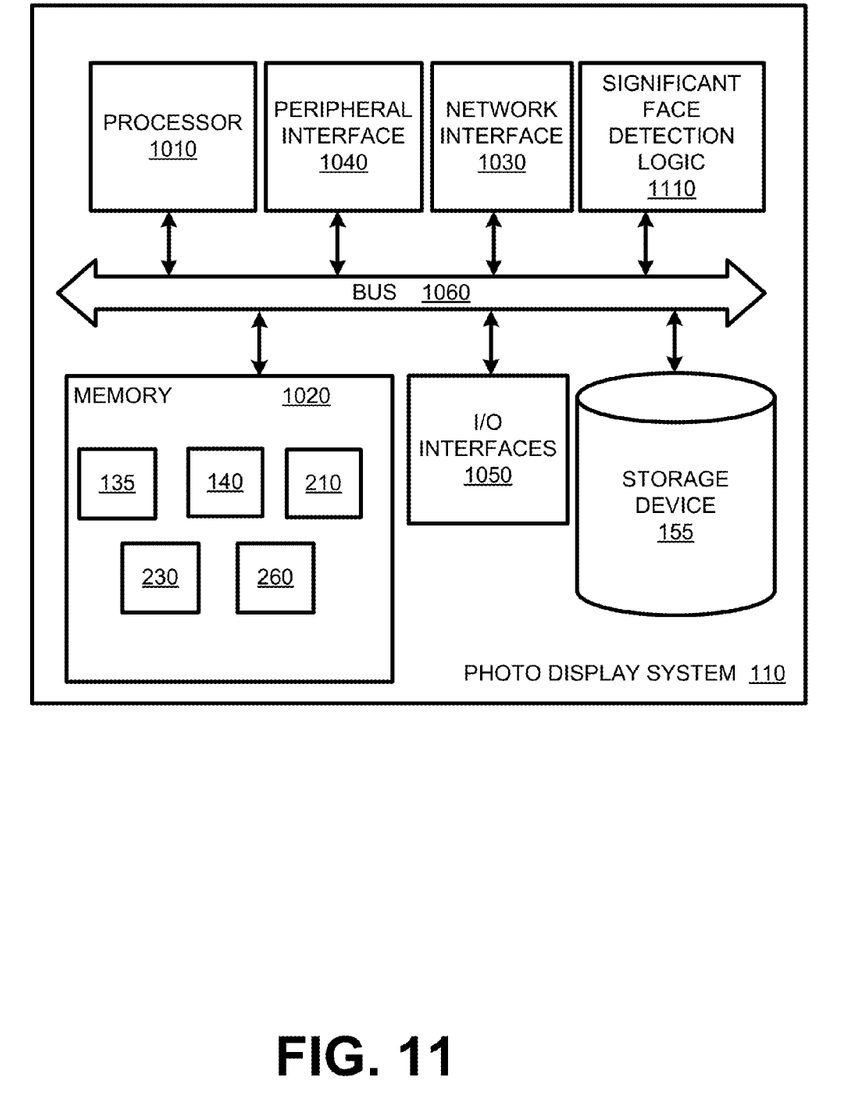
FIG. 11 is a block diagram of the video stream display system of FIG. 1, according to other embodiments.

The components discussed above (e.g., significant face detection engine 135, significant face viewer 140, face detection engine 210 and descriptor generator 260) can be implemented in software (i.e., instructions executing on a processor), and in such an implementation, memory 1020 stores these components. These components can also be implemented in specialized hardware logic. Hardware implementations include (but are not limited to) a programmable logic device (PLD), programmable gate array (PGA), field programmable gate array (FPGA), an application-specific integrated circuit (ASIC), a system on chip (SoC), and a system in package (SiP). FIG. 11 is a block diagram of an embodiment of video stream display system 110 in which the significant face detection engine is implemented in specialized hardware logic (1170). Persons of ordinary skill should also appreciate that these components may be implemented using any combination of hardware and software.

In some embodiments of video stream display system 110, the software components are stored on a computer-readable medium, which in the context of this disclosure refers to any structure which can contain, store, or embody instructions executable by a processor. The computer readable medium can be, for example but not limited to, based on electronic, magnetic, optical, electromagnetic, or semiconductor technology. Specific examples of a computer-readable medium using electronic technology would include (but are not limited to) the following: a random access memory (RAM); a read-only memory (ROM); and an erasable programmable read-only memory (EPROM or Flash memory). A specific example using magnetic technology includes (but is not limited to) a disk drive; and a portable computer diskette. Specific examples using optical technology include (but are not limited to) a compact disk read-only memory (CD-ROM) or a digital video disk read-only memory (DVD-ROM).

Any process descriptions or blocks in flowcharts would be understood as representing modules, segments, or portions of code which include one or more executable instructions for implementing specific functions or steps in the process. As would be understood by those of ordinary skill in the art of the software development, alternate implementations are also included within the scope of the disclosure. In these alternate implementations, functions may be executed out of order from that shown or discussed, including substantially concurrently or in reverse order, depending on the functionality involved.

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

The invention claimed is:

1. A method of detecting significant faces in video streams comprising:
    detecting at least one face in a video stream;
    tracking the at least one face to determine at least one video clip associated with one of a plurality of individuals;
    assigning the at least one video clip to a group of video clips based on the associated one individual;
    detecting at least one significant face in the group of video clips when the detected face meets one or more significance criteria, wherein the significance criteria is associated with a face-frame characteristic;
    displaying a representation of the at least one significant face in association with a representation of the group of video clips; and
    adjusting an order of the one or more significance criteria through a user interface, wherein the tracking the at least one face is performed using backward tracking or motion object tracking, wherein the backward tracking comprises:
        noting a frame in which a greater portion of the detected face comes into view; and
        backward tracking the detected face by tracking an object in those frames in the video stream that are earlier in time than the noted frame to find the first occurrence of the detected face in the video stream.

2. The method of claim 1, wherein the detecting the at least one significant face comprises: detecting a plurality of appearances of one or more significant faces in a corresponding plurality of appearance frames.

3. The method of claim 1, wherein the tracking the at least one face comprises: tracking an appearance of the face of the one of the individuals to determine the at least one video clip associated with the one of the individuals.

4. The method of claim 1, further comprising: in response to a user selection, playing the stored video stream starting at an appearance of the significant face within the stored video stream.

5. The method of claim 1, further comprising: in response to a user selection of a significant face, retrieving a frame identifier associated with an appearance of the significant face within the stored video stream and playing the stored video stream starting at a frame corresponding to the retrieved frame identifier.

6. The method of claim 1, further comprising:
    storing an association between the detected significant face and a frame within the stored video stream in which the detected significant face appears; and
    in response to a user selection of the representation of the stored video stream, playing the stored video stream starting at the frame associated with the detected significant face.

7. A method of detecting significant faces in video streams comprising:
    detecting at least one face in a video stream;
    tracking the at least one face to determine at least one video clip associated with one of a plurality of individuals;
    assigning the at least one video clip to a group of video clips based on the associated one individual;
    detecting at least one significant face in the group of video clips when the detected face meets one or more significance criteria, wherein the significance criteria is associated with a face-frame characteristic;

displaying a representation of the at least one significant face in association with a representation of the group of video clips; and adjusting an order of the one or more significance criteria through a user interface, wherein the tracking the at least one face is performed using backward tracking or motion object tracking, wherein the backward tracking comprises:

noting a frame in which an object obstructing the detected face is moved so that the detected face is less obstructed; and backward tracking the detected face by examining those frames in the video stream that are earlier in time than the noted frame to find the first occurrence of the detected face in the video stream.

8. The method of claim 1, wherein the assigning the at least one video clip to the group of video clips further is based on at least one of time, object color, or face characteristic.

9. The method of claim 1, wherein the at least one significant face is determined based on a threshold of the face frame characteristic; a size of the face relative to frame size, a degree of focus of the face, a resolution of the face, a presence of a smile on the face, an orientation of the face, a position of the face within a frame of the video clip, presence of the face within a predefined area of the frame, a movement of the face within the video clip, a movement of a body associated with the face within the video clip, a presence of audio associated with the frame, a number of individuals within the video clip, and a quantitative measure of an appearance of the face within the video clip.

10. The method of claim 9, wherein the face-frame characteristic includes at least one of: a percentage of the face within a frame containing the face; sharpness of focus of the face; resolution of the face; a presence or absence of a smile on the face; an orientation of the face as compared to other faces in the frame containing the face; presence of the face within a middle portion of the frame containing the face; presence of the face within a side portion of the frame containing the face; movement within the video clip of features of the face that indicate emotion; amount of movement within the video clip of a body associated with the face; speed of movement within the video clip of a body associated with the face; volume of audio associated with the frame containing the face; change in volume of audio associated with the frame containing the face; change in rhythm of audio associated with the frame containing the face; and an amount of time the face appears in the video clip.

11. The method of claim 1, further comprising:

determining a plurality of appearances of the at least one significant face in a corresponding plurality of appearance frames;

storing associations between the detected significant face and the plurality of appearance frames; and in response to a user selection of one of the appearance frames, using the stored association to locate the corresponding appearance frame, and starting stream playback from the beginning of the video stream, from the corresponding appearance frame, or from near the corresponding appearance frame.

12. The method of claim 1, wherein the face-frame characteristic includes at least one of a size of the face relative to frame size, a degree of focus of the face, a resolution of the face, a presence of a smile on the face, an orientation of the face, a position of the face within a frame of the video clip, presence of the face within a predefined area of the frame, a movement of the face within the video clip, a movement of a body associated with the face within the video clip, a presence of audio associated with the frame, a number of individuals within the video clip, and a quantitative measure of an appearance of the face within the video clip.

13. A computing device comprising:

a memory; and a processor configured by instructions retrieved from the memory to:

detect at least one face in a video stream;

track the at least one face to determine at least one video clip associated with one of a plurality of individuals;

assign the at least one video clip to a group of video clips based on the associated one individual;

detect at least one significant face in the group of video clips, based on one or more significance criteria, the significance criteria describing a face-frame characteristic;

display a representation of the at least one significant face in association with a representation of the group of video clips; and adjust an order of the one or more significance criteria through a user interface, wherein the processor is further configured to track the at least one face using backward tracking or motion object tracking, wherein the processor is configured to perform backward tracking by noting a frame in which a greater portion of the detected face comes into view and backward tracking the detected face by tracking an object in those frames in the video stream that are earlier in time than the noted frame to find the first occurrence of the detected face in the video stream.

14. The computing device of claim 13, wherein the processor is further configured to assign the at least one video clip based on at least one of time, object color, or face characteristic.

15. The computing device of claim 13, wherein the face-frame characteristic includes at least one of a size of the face relative to frame size, a degree of focus of the face, a resolution of the face, a presence of a smile on the face, an orientation of the face, a position of the face within a frame of the video clip, presence of the face within a predefined area of the frame, a movement of the face within the video clip, a movement of a body associated with the face within the video clip, a presence of audio associated with the frame, a number of individuals within the video clip, and a quantitative measure of an appearance of the face within the video clip.

16. The computing device of claim 13, wherein the face-frame characteristic includes at least one of: a percentage of the face within a frame containing the face; sharpness of focus of the face; resolution of the face; a presence or absence of a smile on the face; an orientation of the face as compared to other faces in the frame containing the face; presence of the face within a middle portion of the frame containing the face; presence of the face within a side portion of the frame containing the face; movement within the video clip of features of the face that indicate emotion; amount of movement within the video clip of a body associated with the face; speed of movement within the video clip of a body associated with the face; volume of audio associated with the frame containing the face; change in volume of audio associated with the frame containing the face; change in rhythm of audio associated with the frame containing the face; and an amount of time the face appears in the video clip.

17. The computing device of claim 13, wherein the processor is further configured to: compare the significance criteria to a predetermined threshold and to display the representation based at least on the comparison.

18. The computing device of claim 13, wherein the processor is further configured to: in response to a user selection, play the stored video stream starting at an appearance of the significant face within the stored video stream.

19. The computing device of claim 13, wherein the processor is further configured to: in response to a user selection of a significant face, retrieve a frame identifier associated with an appearance of the significant face within the stored video stream and play the stored video stream starting at a frame corresponding to the retrieved frame identifier.

20. The computing device of claim 13, wherein the processor is further configured to:
- store an association between the detected significant face and a frame within the stored video stream in which the detected significant face appears; and
- in response to a user selection of the representation of the stored video stream, play the stored video stream starting at the frame associated with the detected significant face.

* * * * *